United States Patent
Singer

(10) Patent No.: US 9,592,860 B1
(45) Date of Patent: *Mar. 14, 2017

(54) PICK UP TRUCK ELONGATOR

(71) Applicant: Nicholas J. Singer, Irvine, CA (US)

(72) Inventor: Nicholas J. Singer, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,577

(22) Filed: Aug. 16, 2016

Related U.S. Application Data

(63) Continuation-in-part of application No. 14/959,259, filed on Dec. 4, 2015, now Pat. No. 9,452,782.

(51) Int. Cl.
*B62D 33/00* (2006.01)
*B62D 33/027* (2006.01)
*B62D 33/08* (2006.01)
*B62D 21/14* (2006.01)

(52) U.S. Cl.
CPC ......... *B62D 33/0273* (2013.01); *B62D 21/14* (2013.01); *B62D 33/08* (2013.01)

(58) Field of Classification Search
CPC ..... B62D 21/14; B62D 33/0273; B62D 33/08
USPC .......................................... 296/26.11, 26.08
See application file for complete search history.

(56) References Cited

U.S. PATENT DOCUMENTS

| | | | |
|---|---|---|---|
| 2,872,239 A | 2/1959 | Bowness et al. | |
| 4,472,639 A | 9/1984 | Bianchi | |
| 4,531,773 A | 7/1985 | Smith | |
| 4,596,417 A | 6/1986 | Bennett | |
| 5,154,470 A | 10/1992 | Bringman, Jr. | |
| 5,244,335 A | 9/1993 | Johns | |
| 5,456,511 A | 10/1995 | Webber | |
| 5,468,038 A | 11/1995 | Sauri | |
| 5,669,654 A | 9/1997 | Eilers et al. | |
| 5,755,480 A | 5/1998 | Bryan | |
| 5,775,759 A | 7/1998 | Cummins | |
| 5,788,311 A | 8/1998 | Tibbals | |
| 5,857,724 A | 1/1999 | Jarman | |
| 5,924,753 A | 7/1999 | DiBassie | |
| 5,997,066 A | 12/1999 | Scott | |
| 6,019,410 A | 2/2000 | Trostle et al. | |
| 6,179,360 B1 | 1/2001 | Davian | |
| 6,193,294 B1 | 2/2001 | Disner et al. | |
| 6,279,980 B1 | 8/2001 | Straschewski | |
| 6,340,190 B1 | 1/2002 | Rosebrugh et al. | |
| 6,367,858 B1 | 4/2002 | Bradford | |
| 6,378,926 B1 | 4/2002 | Renze et al. | |
| 6,422,630 B1 | 7/2002 | Heaviside | |

(Continued)

FOREIGN PATENT DOCUMENTS

CA      1244858 A1   11/1988
DE       814244 C     9/1951

*Primary Examiner* — Joseph D Pape
(74) *Attorney, Agent, or Firm* — Stetina Brunda Garred and Brucker

(57) ABSTRACT

A replacement tailgate for the purpose of elongating the pickup truck may be installed on a truck bed wherein the replacement tailgate can be unfolded in order to elongate a length of the truck bed. The replacement tailgate may have front and rear shells that are used to support objects placed in the truck bed as well as act as the new tailgate when the truck bed length is elongated. Various panels may be unfolded in order to trap objects within the truck bed when the replacement tailgate is unfolded in order to elongate the truck bed length.

10 Claims, 20 Drawing Sheets

(56) References Cited

U.S. PATENT DOCUMENTS

| | | |
|---|---|---|
| 6,513,850 B1 | 2/2003 | Reed |
| 6,550,841 B1 | 4/2003 | Burdon et al. |
| 6,676,182 B2 | 1/2004 | Fitts |
| D504,384 S | 4/2005 | Straschewski |
| 6,908,134 B1 | 6/2005 | Summers |
| 6,918,624 B2 | 7/2005 | Miller et al. |
| 6,994,363 B2 | 2/2006 | Seksaria et al. |
| 7,021,689 B1 | 4/2006 | Weisbeck, III |
| 7,111,886 B1 | 9/2006 | Miller |
| 7,204,537 B1 | 4/2007 | Oh et al. |
| 7,488,021 B1 | 2/2009 | Roos |
| 8,109,552 B2 | 2/2012 | Nelson |
| 8,182,012 B1 | 5/2012 | Brister |
| 9,409,608 B2 * | 8/2016 | Waskie ................ B60P 3/40 |
| 2002/0000732 A1 | 1/2002 | Sanders |
| 2002/0140244 A1 | 10/2002 | Kuhn et al. |
| 2006/0214449 A1 | 9/2006 | Klusmeier |
| 2010/0078955 A1 | 4/2010 | Smith |
| 2012/0228893 A1 | 9/2012 | Lu et al. |

\* cited by examiner

PICK UP TRUCK ELONGATOR

CROSS-REFERENCE TO RELATED APPLICATIONS

This application is a continuation-in-part application of U.S. patent application Ser. No. 14/959,259, filed on Dec. 4, 2015, the entire content of which is expressly incorporated herein by reference.

STATEMENT RE: FEDERALLY SPONSORED RESEARCH/DEVELOPMENT

Not Applicable

BACKGROUND

The various embodiments and aspects described herein relate to an accessory for a truck bed to elongate a length of the truck bed.

Trucks have beds that come in a variety of sizes. By way of example and not limitation, the truck beds may be a short bed or long bed. The short bed may serve the purposes of its owner a majority of the time but at certain times, the owner may require a slightly longer truck bed to haul larger or longer objects. In this regard, the owner may let down his or her tailgate and allow the objects to hang out of the back side of the truck bed when hauling the long object. In doing so, the object becomes a safety hazard in that other vehicles and pedestrians may not see the elongated object hanging out of the truck bed and may inadvertently hit the object causing injury to the person and/or damage to the object.

Additionally, the objects configuration may not be conducive to easily tying the object down in the truck bed. The tailgate is typically lifted upward in order to trap the object within the truck bed so that even if the object slides in the truck bed, the object would still remain within the truck bed.

Accordingly, there is a need in the art for an accessory for a truck bed.

BRIEF SUMMARY

A pickup truck elongator in the form of the tailgate is disclosed herein. The factory tailgate may be replaced with a replacement tailgate that can be pivoted downward to elongate the length of the factory truck bed. The replacement tailgate has a front shell that can be pivoted upward to function as the new tailgate when a rear shell of the replacement tailgate acts as the support to elongate the length of the factory truck bed. Left and right side panels may be unfolded in order to form an enclosure with left and right side walls of the truck bed. Additionally, the rear shell can be fabricated from first and second telescoping panels that allow the user to further expand the factory truck bed.

Alternatively, the original tailgate or replacement tailgate may act as the support to elongate the length of the factory truck bed. Side panels are tucked away in the cavity adjacent a rear side of the left and right truck side bed walls. The panels are folded out and engaged to the upper surface of the tailgate in order to retain objects placed in the truck bed within the truck bed.

More particularly, a tailgate for a bed of a truck is disclosed. The tailgate may comprise a rear shell, a front shell, left and right side panels and left and right latches. The rear shell may be sized and configured to fit between left and right sidewalls of the truck bed. The rear shell may be pivotally attached to a lower rear edge of the truck bed. The front shell may be pivotally attached to an upper edge of the rear shell. The front shell may be pivoted greater than 180 when the front shell is disposed generally parallel to the rear shell. The left and right side panels may be pivotally attached to left and right side portions of the front shell. The left and right latches may be attached to the left and right side panels and the left and right sidewalls of the truck bed to mitigate unwanted movement of the rear shell, front shell and the left and right panels during forward movement of the truck.

The rear shell may comprise first and second telescoping panels for elongating a length of the bed of the truck. The first and second telescoping panels may be attached to each other as a tongue and groove connection.

The tailgate may further comprise left and right elongating side panels which may be pivotally attached to respective ones of the left and right side panels. The left and right latches may be attached to the left and right elongating side panels and the left and right side walls of the truck bed for securing the left and right side panels and the left and right elongating side panels to the left and right side walls of the truck bed.

The rear shell, front shell, left and right side panels may be fabricated from carbon fiber, aluminum, fiberglass, plastic or steel.

The front shell may be pivoted to an angle of about 270 degrees to allow the front shell to hang down when loading and unloading the truck bed.

The left and right latches may be removably attached to left and right standard latch receivers of the truck bed.

The tailgate may further comprise a cover for a pivot joint between the front and rear shells.

In another aspect, a method of elongating a bed length of a truck is disclosed. The method may comprise the steps of providing a tailgate for a bed of a truck and pivotally attaching a lower edge of the rear shell to the lower rear edge of the truck bed. In the providing step of the method, the tailgate may comprise a rear shell, a front shell, left and right side panels and left and right latches. The rear shell may be sized and configured to fit between left and right sidewalls of the truck bed. The rear shell may be pivotally attached to a lower rear edge of the truck bed. The front shell may be pivotally attached to an upper edge of the rear shell. The front shell may be pivoted greater than 180 degrees when the front shell is disposed generally parallel to the rear shell. The left and right side panels may be pivotally attached to left and right side portions of the front shell. The left and right latches may be attached to the left and right side panels and the left and right sidewalls of the truck bed to mitigate unwanted movement of the rear shell, front shell and the left and right panels during forward movement of the truck.

The method may further comprise the step of rotating the tailgate so that the front and rear shells are generally parallel to a ground. The method may also further comprise the steps of rotating the front shell about an upper edge of the rear shell so that the front and rear shells are about 90 degrees from each other; rotating the left and right side panels toward the left and right sidewalls of the truck bed; and securing the left and right side panels to the left and right sidewalls of the truck bed with the left and right latches.

The method may also further comprise the steps of elongating telescoping first and second panels of the front shell to elongate a length of the truck bed; pivoting left and right elongating side panels from the left and right side panels; and securing the left and right elongating side panels to the left and right sidewalls of the truck bed with the left and right latches.

In another aspect, a tailgate extender for a bed of a truck is disclosed. The tailgate extender may comprise first, second and third driver-side vertical panels and first, second and third passenger-side vertical panels.

The first driver side vertical panel may be pivotally attached to a driver side sidewall of the bed of the truck. The second driver side vertical panel may be pivotally attached to the first driver side vertical panel. The third driver side vertical panels may be pivotally attached to the second driver side vertical panel. The first, second and third driver side vertical panels may be stacked adjacent to each other and disposed in a cavity formed at a rear inner portion of the driver side sidewall of the bed of the truck. The first driver side vertical panel may be pivoted so as to be parallel to a driver side edge of the tailgate. The second and third driver side vertical panels may be pivoted so as to be parallel to a back edge of the tailgate.

The first passenger side vertical panel may be pivotally attached to a passenger side sidewall of the bed of the truck. The second passenger side vertical panel may be pivotally attached to the first passenger side vertical panel. The third passenger side vertical panels may be pivotally attached to the second passenger side vertical panel. The first, second and third passenger side vertical panels may be stacked adjacent to each other and disposed in a cavity formed at a rear inner portion of the passenger side sidewall of the bed of the truck. The first passenger side vertical panel may be pivoted so as to be parallel to a passenger side edge of the tailgate. The second and third passenger side vertical panel may be pivoted so as to be parallel to a back edge of the tailgate.

The tailgate extender may further comprising a replacement tailgate defining an upper surface with a groove for receiving the second and third driver-side and passenger side vertical panels. The groove may be parallel with the back edge of the replacement tailgate.

The second and third driver side and passenger side vertical panels may have flexible strips at a bottom end of the second and third driver side and passenger side vertical panels which are receivable in the groove formed in the replacement tailgate.

In another aspect, a method of extending a truck bed of a truck is disclosed. The method may comprise the steps of providing driver-side first, second and third vertical panels which are stacked upon each other and disposed in a driver-side cavity formed by a driver-side sidewall of the truck bed; providing a passenger-side first, second and third vertical panels which are stacked upon each other and disposed in a passenger-side cavity formed by a passenger-side sidewall of the truck bed; pivoting a tailgate to an opened position so that an upper surface of the tailgate is generally coplanar with an upper surface of the truck bed; pivoting the driver side first, second and third vertical panels out from the driver side cavity so that the driver side first vertical panel is parallel with a driver side edge of the tailgate; pivoting the passenger side first, second and third vertical panels out from the passenger side cavity so that the passenger side first vertical panel is parallel a passenger side edge of the tailgate; and pivoting the driver side and passenger side second and third vertical panels away from the driver side and passenger side first vertical panels so that the second and third vertical panels are parallel to a back edge of the tailgate.

In the method, the step of pivoting the driver side and passenger side second and third vertical panels away from the driver side and passenger side first vertical panels may include the steps of pivoting the driver side third vertical panel away from the driver side second vertical panel; and pivoting the passenger side third vertical panel away from the passenger side third vertical panel.

In the method, the step of pivoting the driver side and passenger side second and third vertical panels away from the driver side and passenger side first vertical panels may also include the step of disposing weather stripping attached to bottom portions of the driver side and passenger side second and third vertical panels in a groove formed in the upper surface of the tailgate.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 11 illustrates the front shell of the tailgate pivoted so that the pivoting angle is about 270° between the front shell and the rear shell;

DETAILED DESCRIPTION

Figure 1:
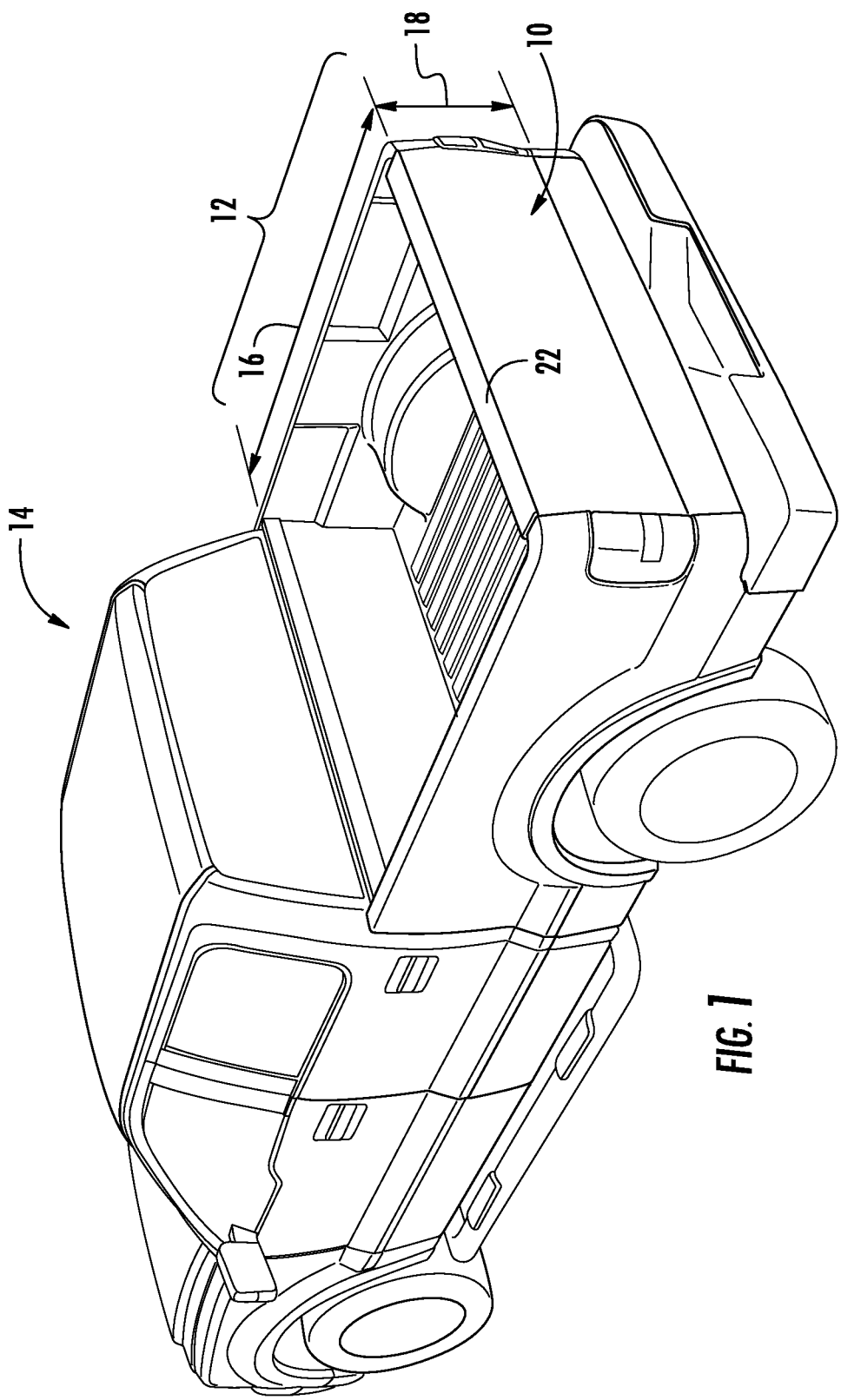
FIG. 1 is a perspective view of a truck with a replacement tailgate installed on a bed of the truck.

Referring now to the drawings, a replacement tailgate 10a for a bed 12 of the truck 14 for the purpose of elongating the pickup truck is shown. The tailgate 10a may replace the factory tailgate and enable the user to elongate the factory length 16 of the truck bed 12 of the truck 14. The tailgate 10a can elongate the factory length 16 of the truck bed 12 about a height 18 of the truck bed 12 or an elongated length 20 (see FIG. 11). The tailgate 10, 10a can also be secured to standard factory latching mechanisms of the factory installed truck bed so that no or little modification to the truck bed 12 is necessary in order to retrofit the truck 14 with the tailgate 10. Alternatively, the factory tailgate may be used to elongate the factory length 16 of the truck bed 12 of the truck 14.

Figure 6:
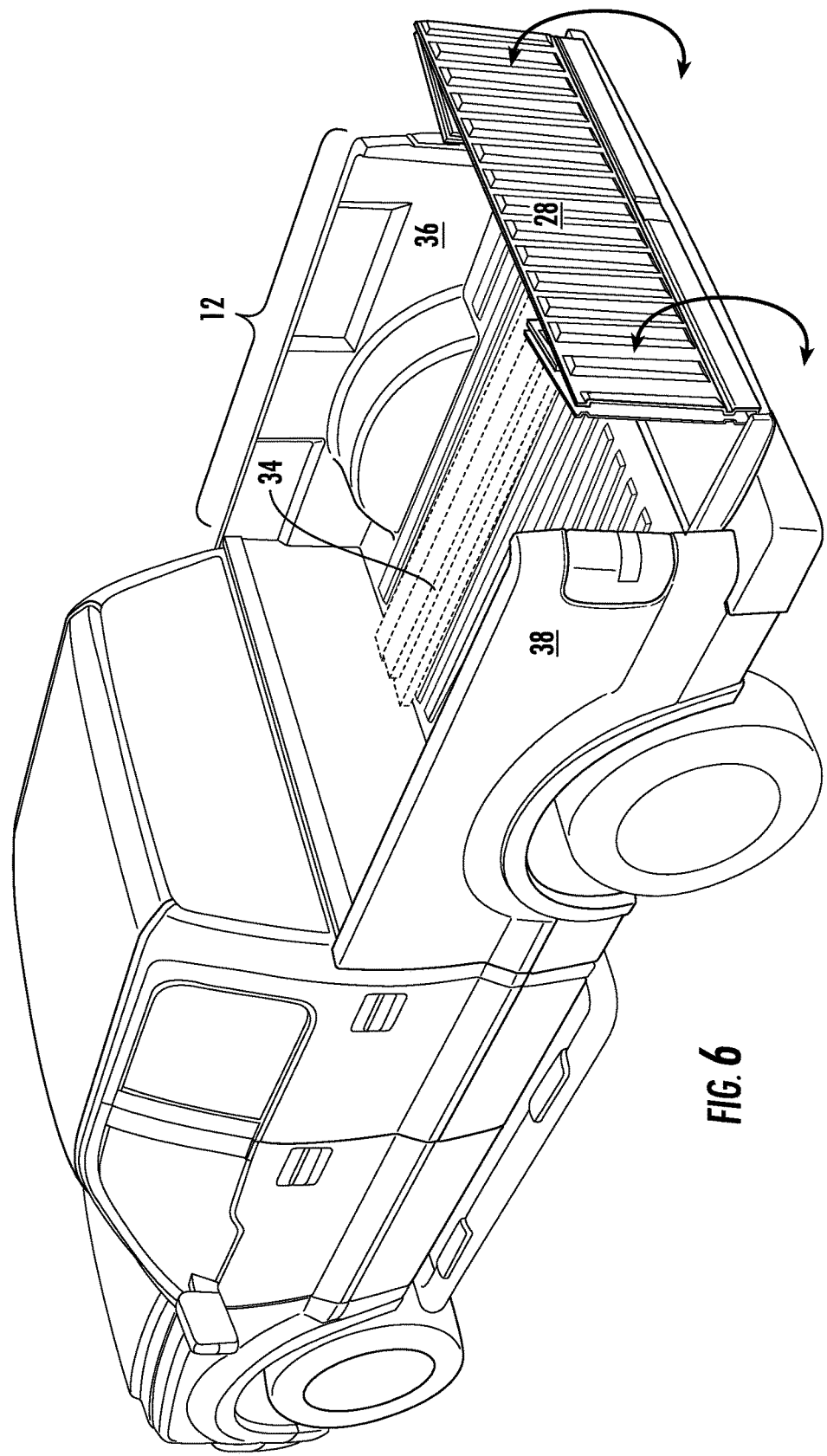
FIG. 6 illustrates the left and right side panels being pivoted outward when the rear shell is 90° with respect to the front shell.
Figure 7:
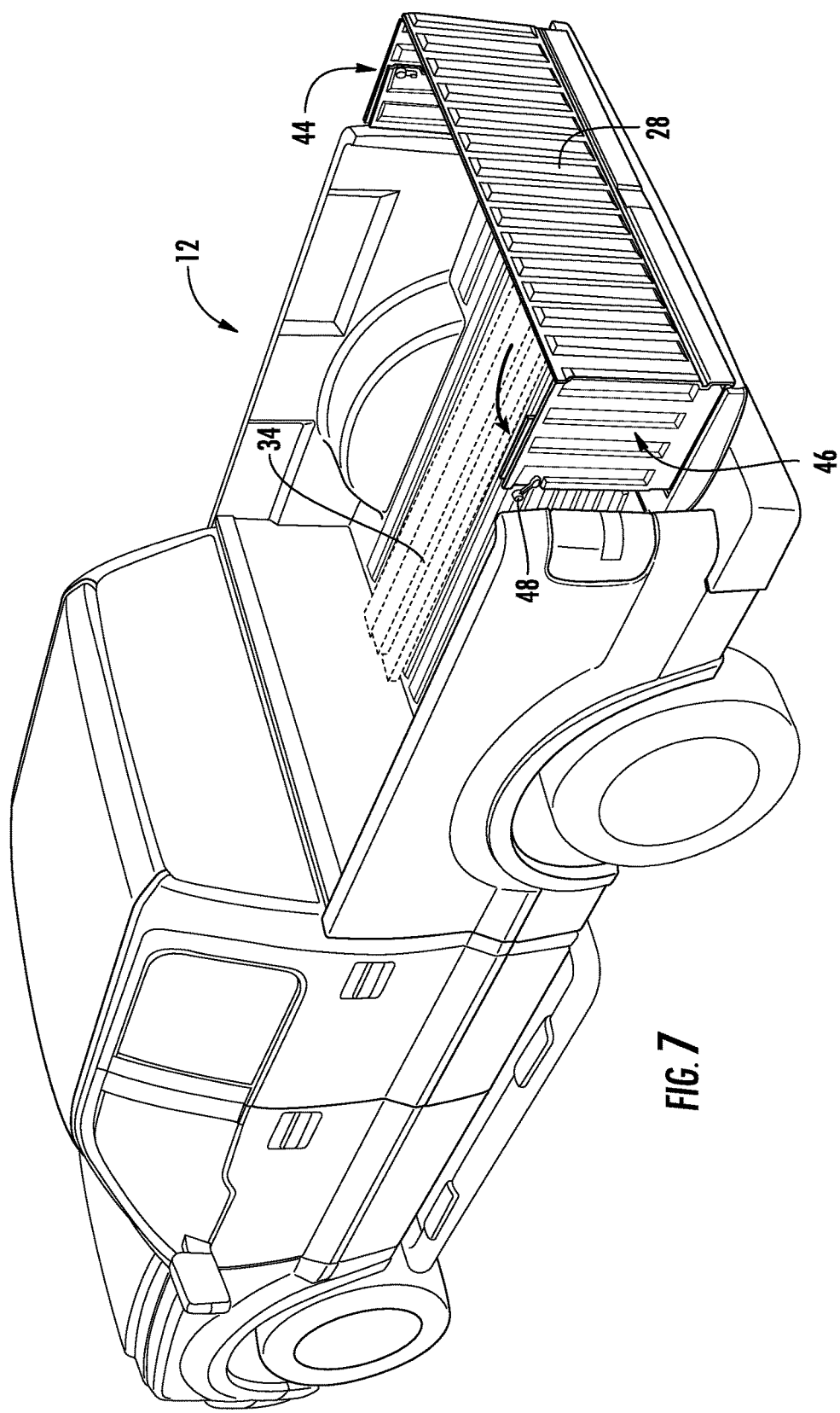
FIG. 7 illustrates the left and right side panels pivoted outward.
Figure 8:
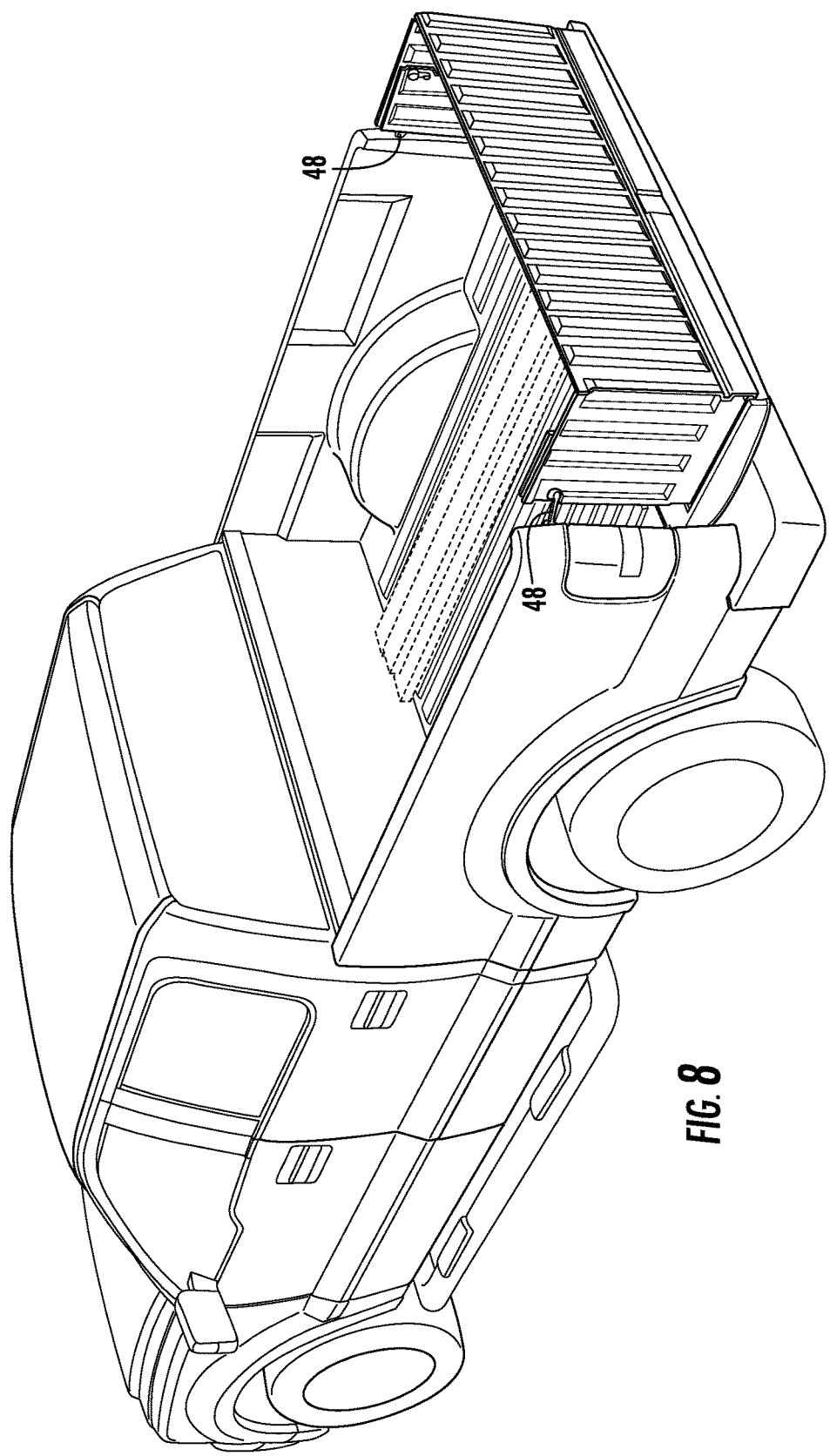
FIG. 8 illustrates latches of the left and right side panels engaging standard latch receivers of the truck bed.
Figure 9:
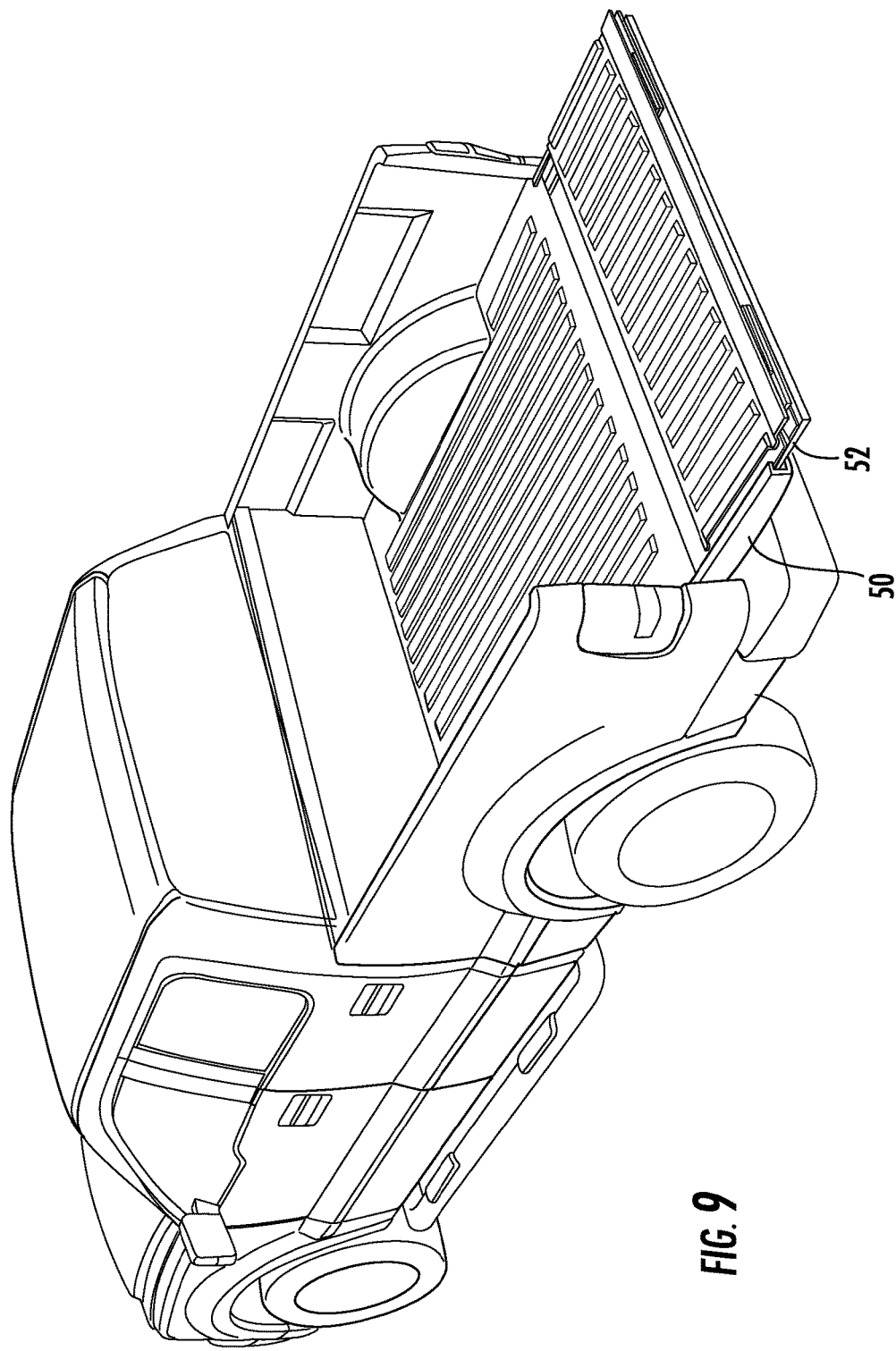
FIG. 9 illustrates first and second telescoping panels of the rear shell.

Referring now the FIGS. 1-8, the tailgate 10 is shown as being deployed to elongate the length 16 of the truck bed 12 to the height 18 of the truck bed 12. In particular, the tailgate 10 has cover 22. The cover 22 is disposed on top of upper ends 24, 26 of front and rear shells 28, 30 of the tailgate 10. The cover 22 prevents objects from being inadvertently disposed between the front and rear shells 28, 30. The front shell 28 functions as the tailgate when the factory length 16 of the truck 12 is elongated by the height 18 of the truck bed 12, as shown in FIG. 8. The rear shell 30 functions as a bottom support for elongating the length 16 so that longer objects 34 can be placed in the truck bed 12 and secured therein by the tailgate 32. Pivoting the cover 22 about the upper end 26 of the rear shell 30 may enable the front shell 28 to be pivoted about the rear shell 30.

Figure 2:
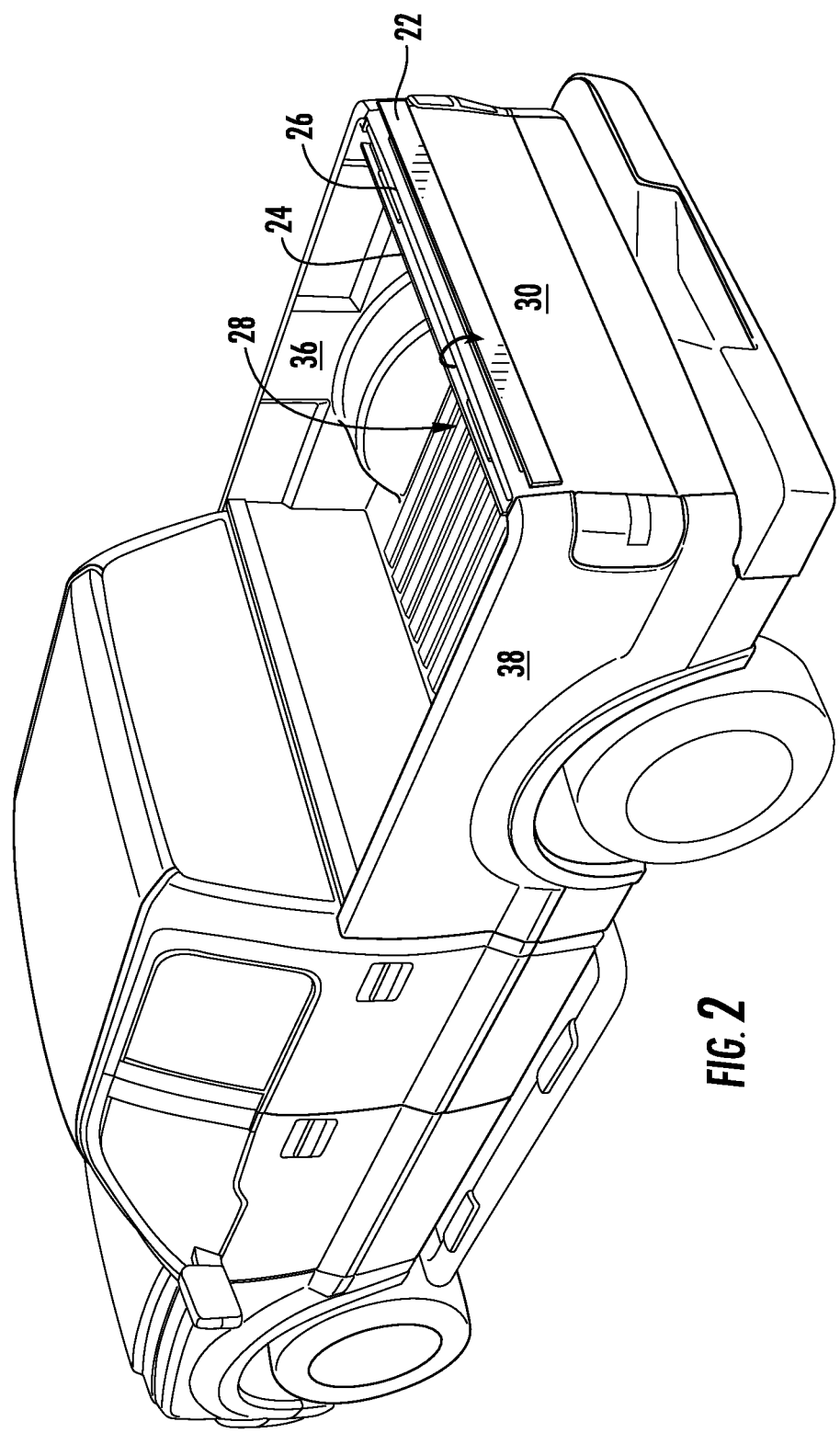
FIG. 2 illustrates a cover of the tailgate shown in FIG. 1 pivoted outward.
Figure 3:
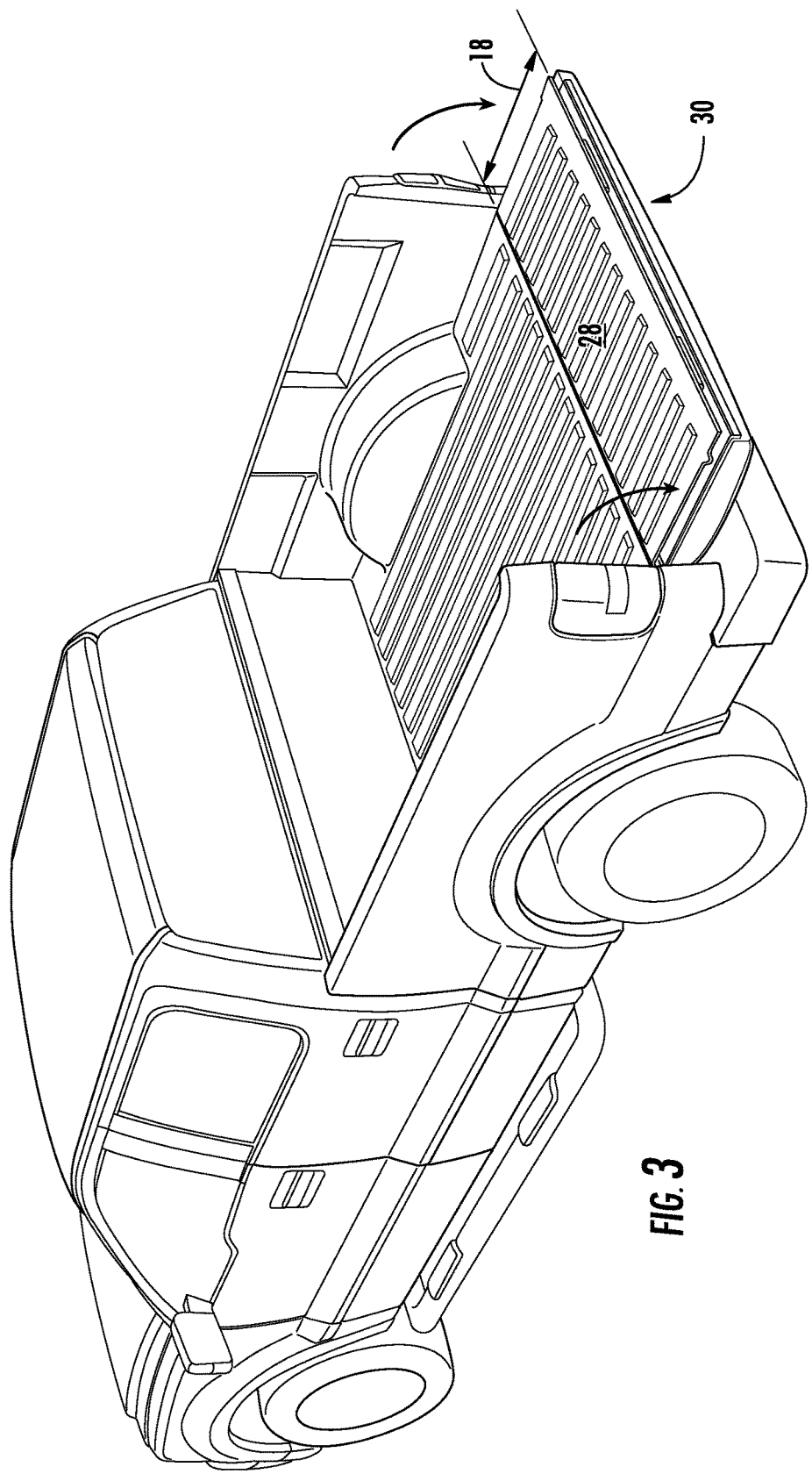
FIG. 3 illustrates the tailgate shown in FIG. 2 pivoted downward.

After pivoting the cover 22 to the open position as shown in FIG. 2, the user may release the tailgate 10 from the left and right side walls 36, 38 to lower the front and rear shells 28, 30 to elongate the factory length 16 of the truck bed 12. As discussed above, the cover 22 may be attached and configured to the tailgate 10 so that pivoting of the cover 22 to the open position enables pivoting of the front shell 28 about the rear shell 30. In this regard, the cover 22 can be pivoted to the open position either before or after the tailgate 10 is traversed to the down position, as shown in FIG. 3. Moreover, it is also contemplated that the ability of the front and rear shells 28, 30 to be pivoted about each other can be independent of the position of the cover 22. The cover 22 can be held in the closed position, as shown in FIG. 1 or in the open position as shown in FIG. 2 with a detent or other latching mechanism.

Figure 4:
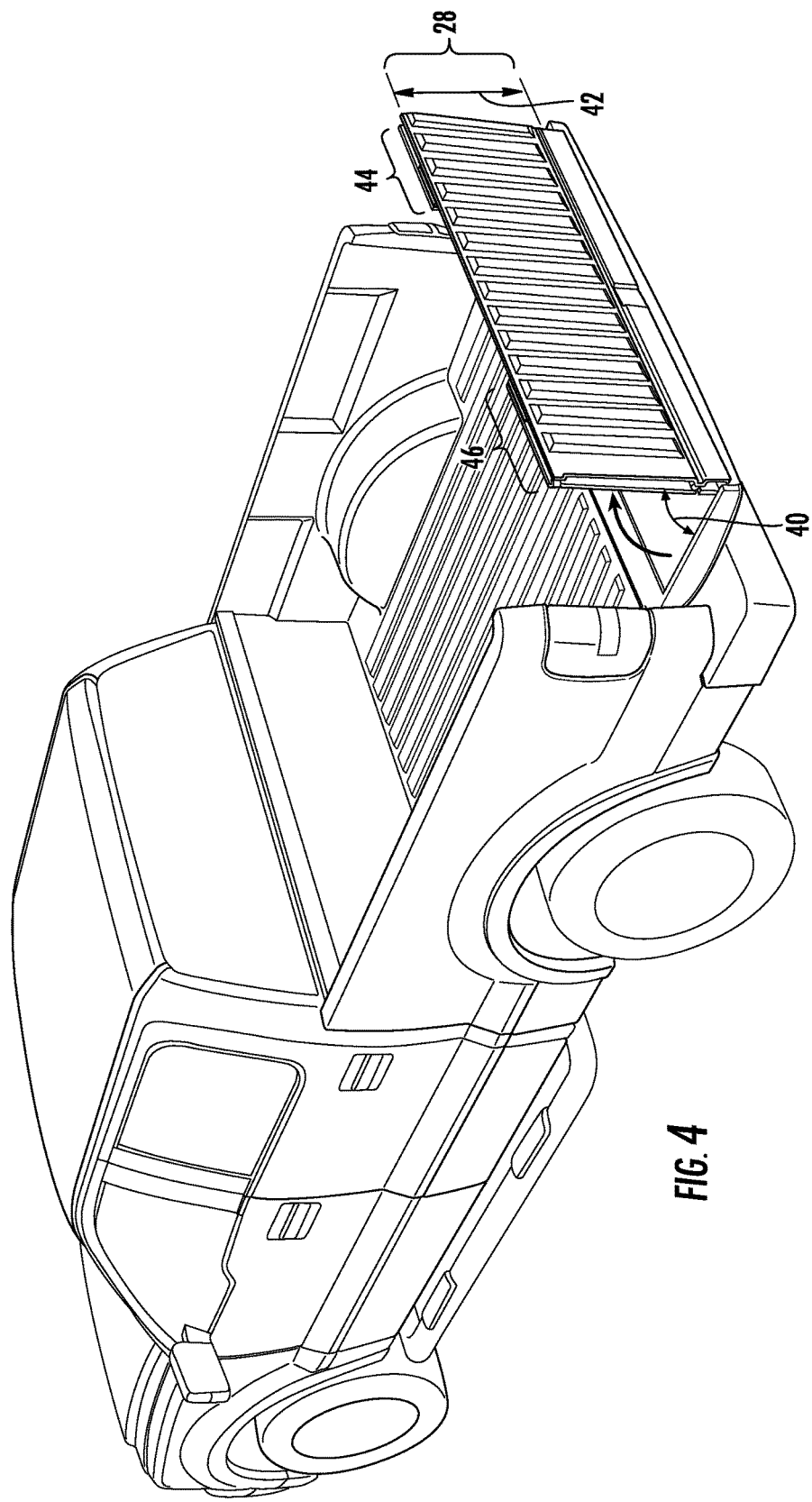
FIG. 4 illustrates a front shell of the tailgate pivoted upward so that the front shell and a rear shell are at a 90° pivoting angle.
Figure 5:
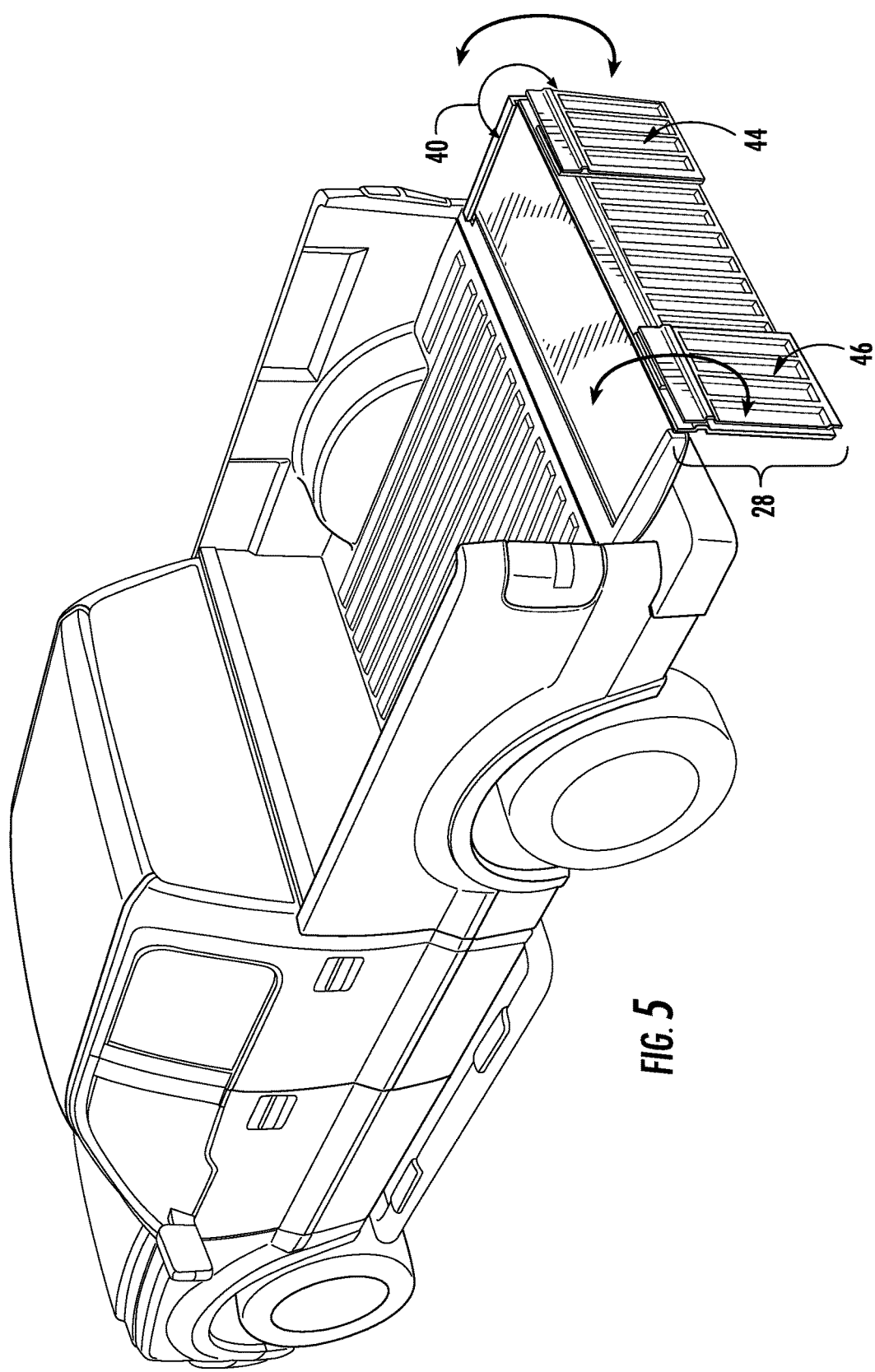
FIG. 5 illustrates the front shell of the tailgate pivoted so that the pivoting angle is at 270° between the front shell and the rear shell.

Once the tailgate 10 is pivoted downward, the front shell 28 can be pivoted upward as shown in FIG. 4. The pivoting angle 40 can be limited to between about 90° and about 270° (see FIG. 5), as shown in FIGS. 4 and 5. The pivoting angle 40 can be limited by way of a detent or other mechanism known in the art or developed in the future. When the front shell 28 is pivoted 270°, the user can slide objects 34 into the bed then lift the front shell 28 upward to trap the objects 34 in the truck bed 12, as shown in FIG. 6.

The front shell 28 may have a height 42 (see FIG. 4) equal to about the height 18 of the tailgate 10. Alternatively, the height 42 of the front shell 28 may be greater than or less than the height 18 but is preferably about equal to the height 18 of the tailgate 10.

As shown in FIG. 7, left and right side panels 44, 46 can be rotated outward and secured to the left and right side walls 36, 38 of the truck bed 12 with the latching mechanism 48. The latching mechanism 48 may be secured to the standard receivers on truck beds so that no or little modification to the truck bed 12 is needed. By securing the latching member 48 to the standard receivers on the truck bed 12, the pivoting angle 40 of the front shell 28 is locked to 90°. Also, the elongated length 20 is set to the height 18 of the tailgate 10. Objects 34 placed within the truck bed 12 remain secured therein by way of the front shell 28 and the left and right side panels 44, 46. The left and right side panels 44, 46 may remain in the un-deployed state as shown in FIGS. 4 and 5. By way of example and not limitation, the left and right side panels 44, 46 and the front shell 28 may have magnets and/or detents that hold the left and right side panels 44, 46 against the front shell 28. Other mechanisms are also contemplated such as detents, latches, etc.

In a further feature, the tailgate 10 may be used to elongate the factory length 16 of the truck bed 12 greater than the height and up to an elongated length 20. To this end, referring now to FIGS. 9-14 the rear shell 30 may be fabricated from telescoping first and second telescoping panels 50, 52. By extending the telescoping first and second panels 50, 52, the truck bed 12 can be elongated by length 54 (see FIG. 10) which is greater than the height 18. The second telescoping panel 52 may be traversed between the retracted position, shown in FIG. 3 or the elongated position, shown in FIG. 10. The second telescoping panel 52 may be retained in the retracted position or elongated position by way of a detent or other mechanism known in the art or developed in the future.

Figure 10:
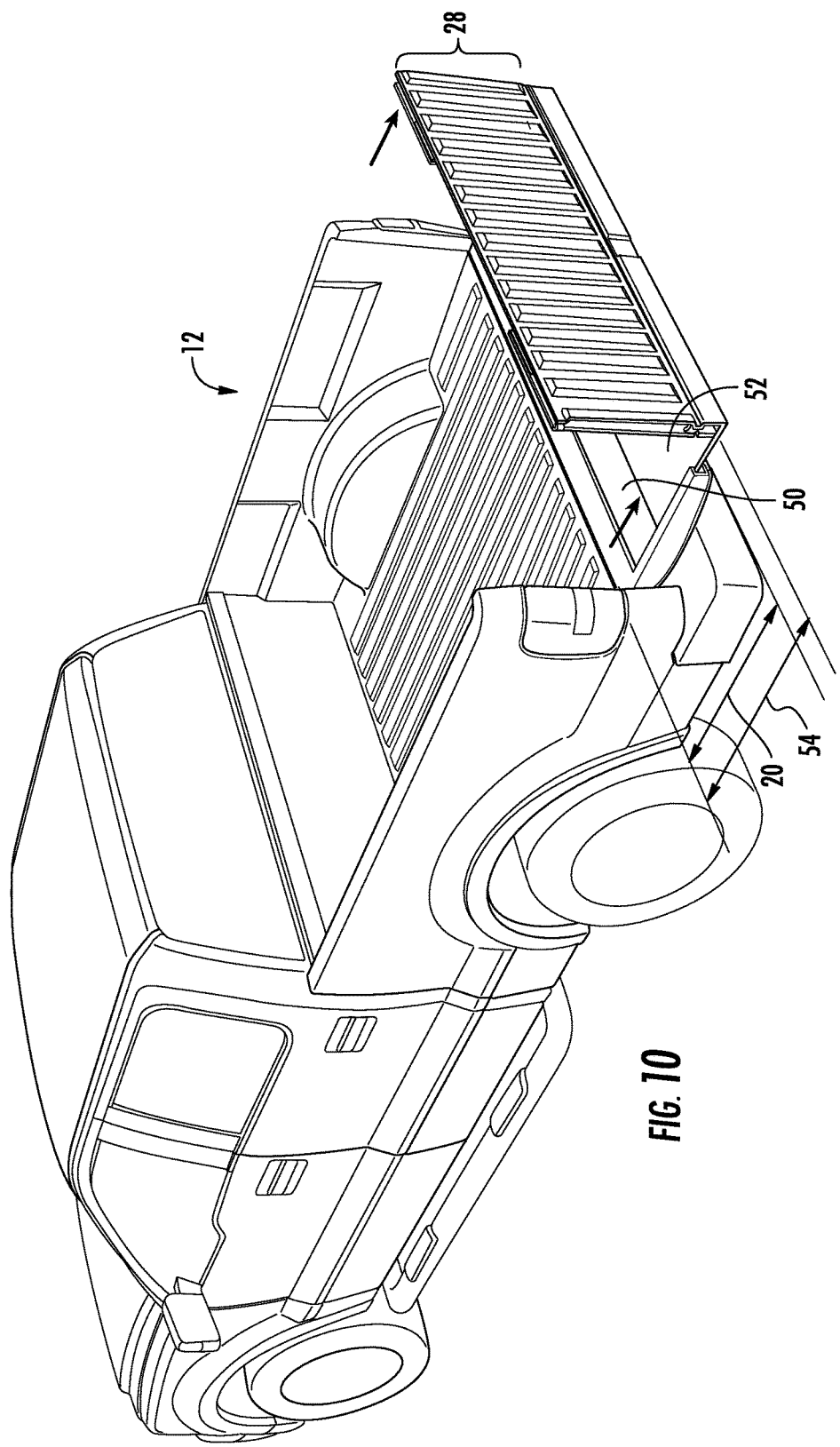
FIG. 10 illustrates the front shell of the tailgate pivoted upward so that the front shell and the rear shell are at a 90° pivoting angle.
Figure 17:
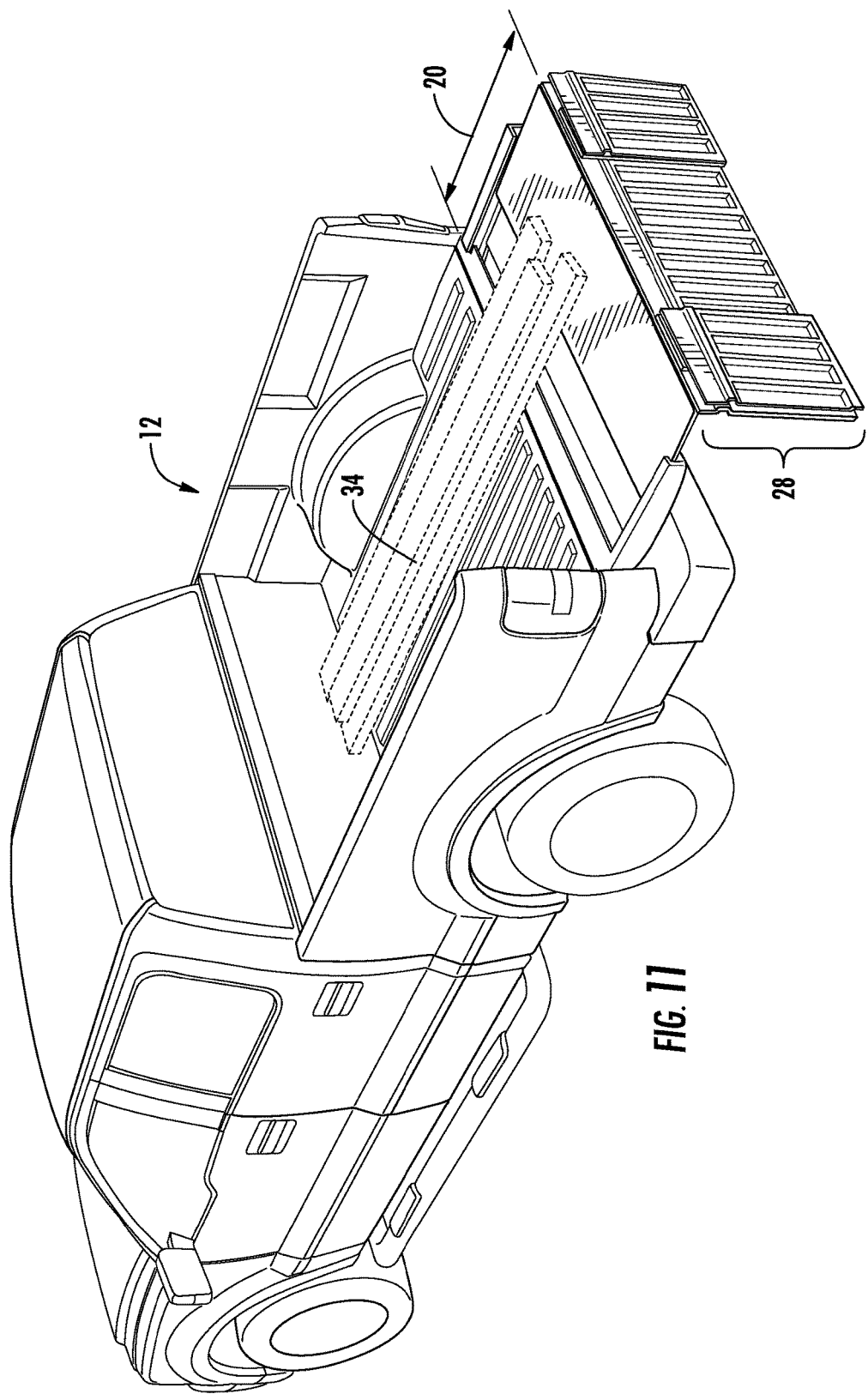
FIG. 17 illustrates the elongator of FIG. 15 with first, second and third vertical panels being traversed to an expanded position.
Figure 12:
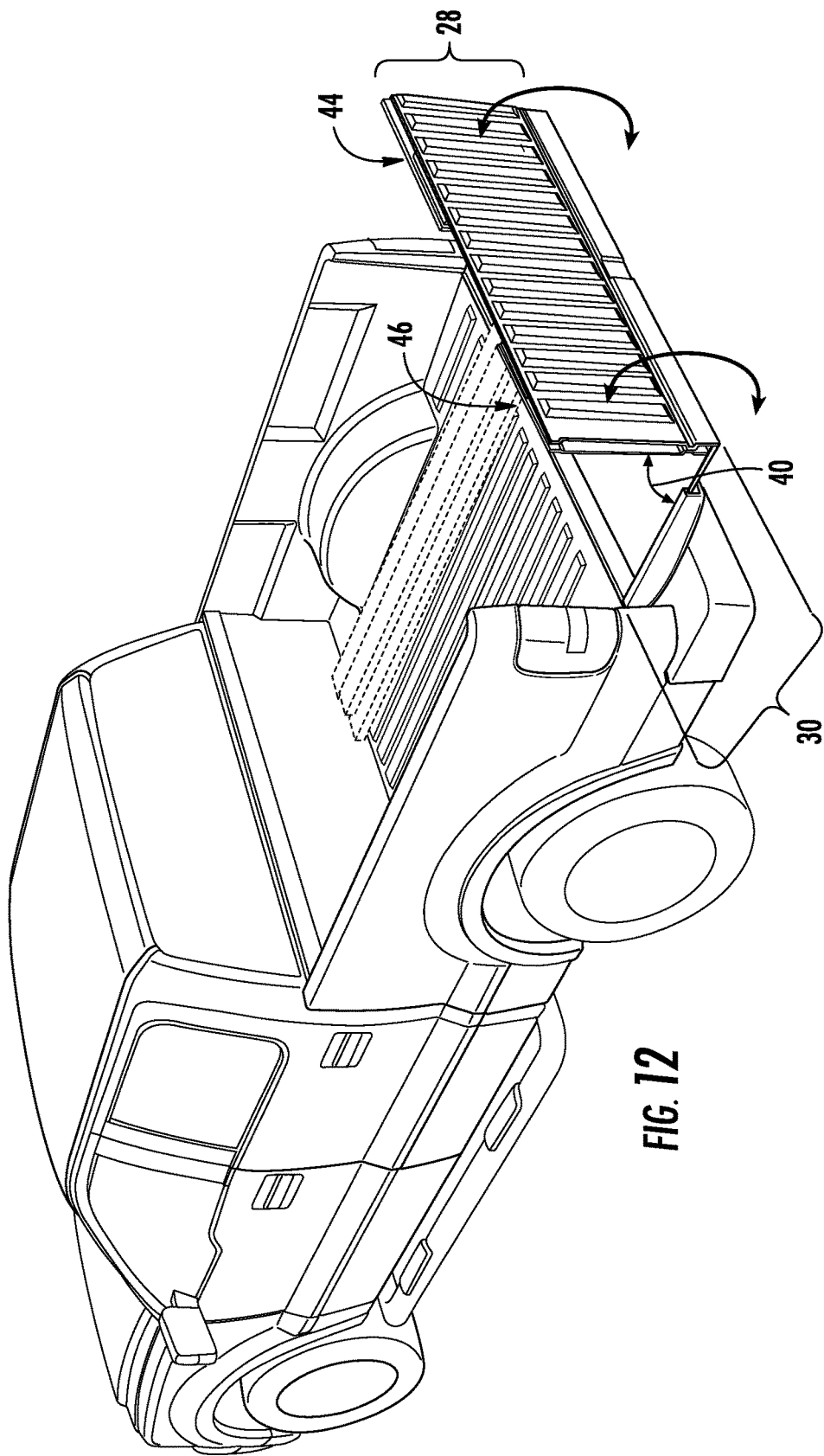
FIG. 12 illustrates the front shell pivoted back to the 90° pivoting angle after objects are placed in the truck bed.
Figure 13:
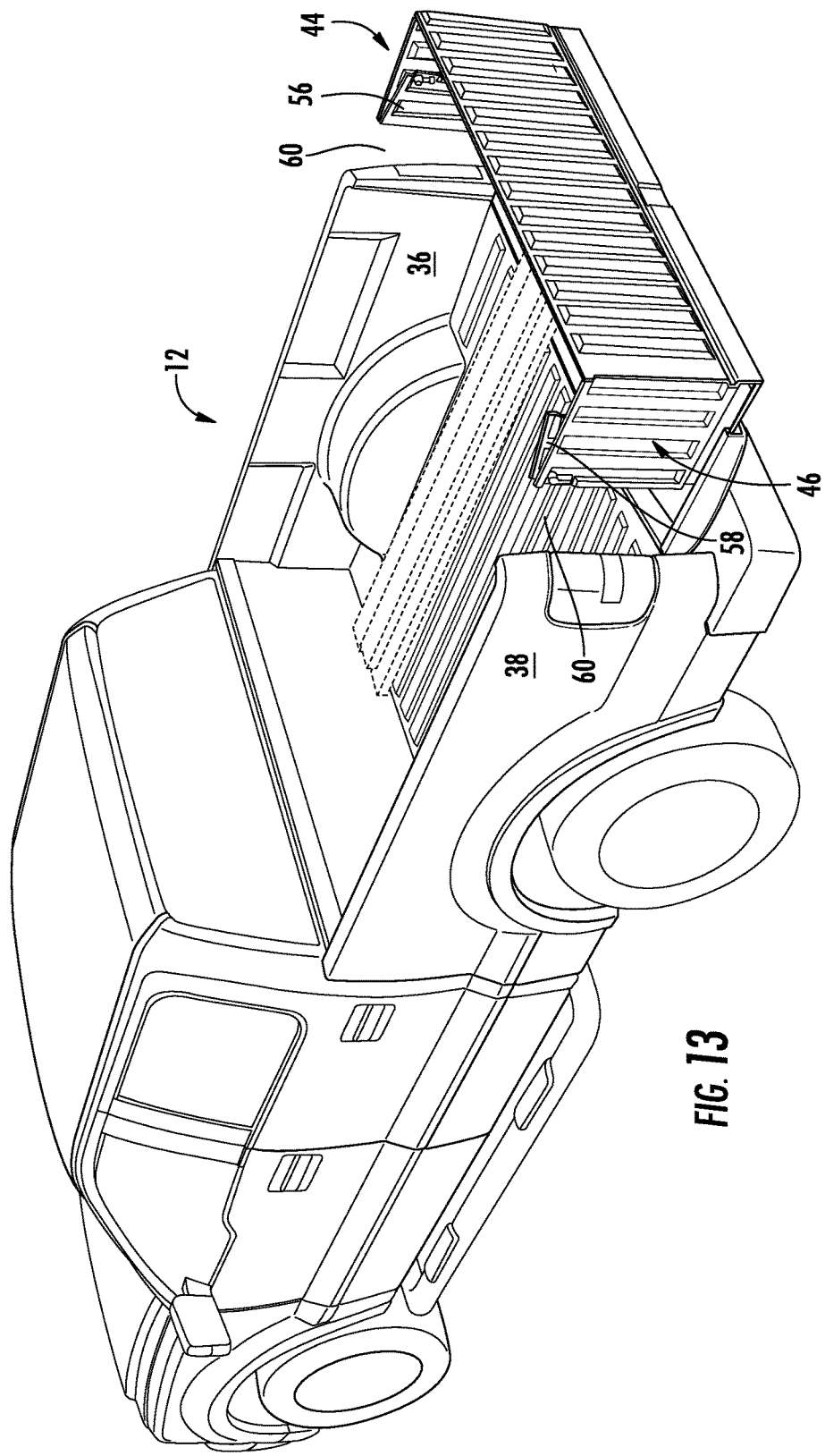
FIG. 13 illustrates the left and right side panels being pivoted outward.
Figure 14:
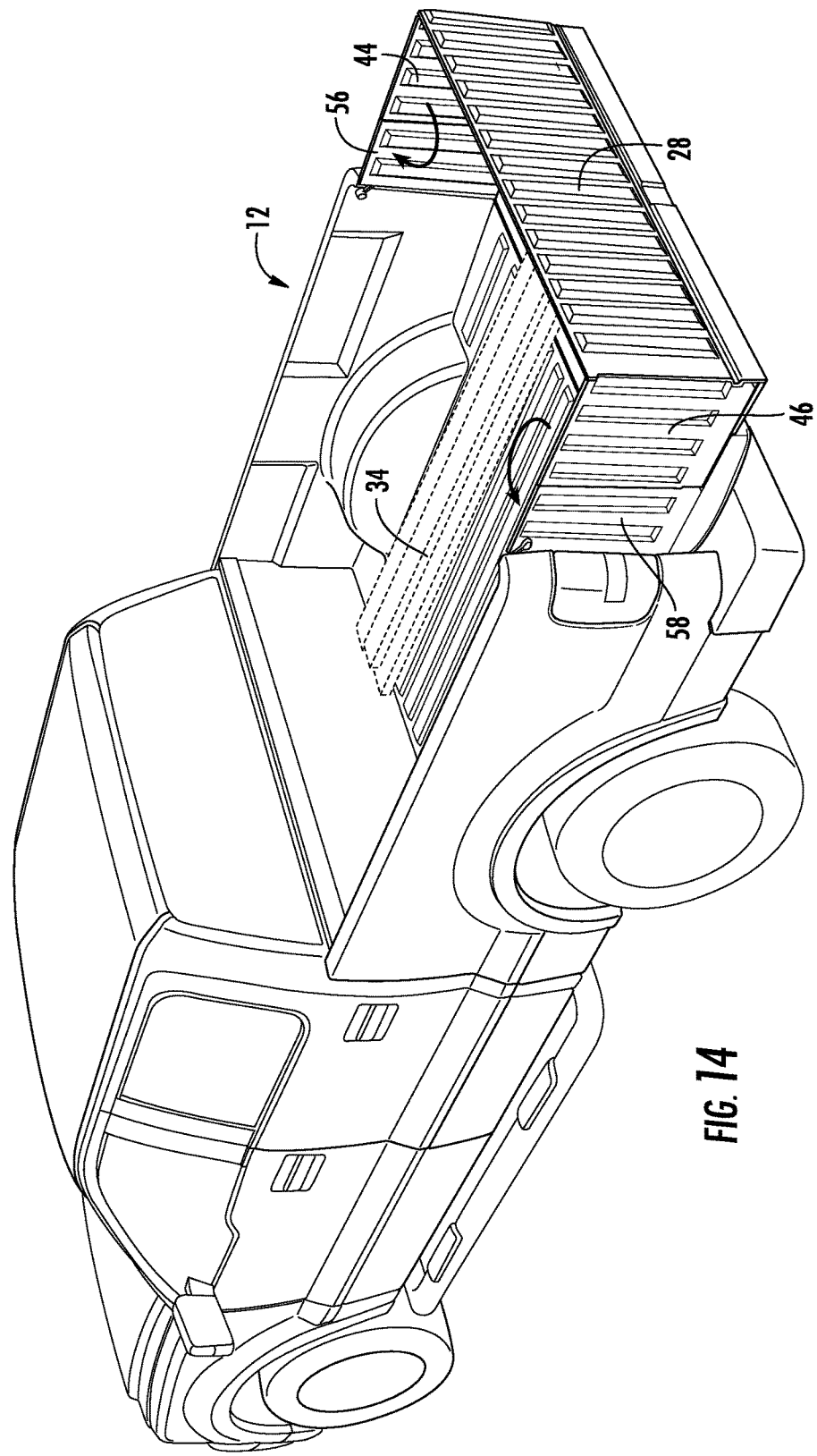
FIG. 14 illustrates left and right elongating side panels pivoted outward and secured to standard receivers of the truck bed with latches.

Once the second telescoping panel 52 is traversed to the expanded position as shown in FIG. 10, the front shell 28 may be pivoted downward so that the front shell 28 hangs downward as shown in FIG. 11. In this way, objects 34 can be slid onto or off of the truck bed 12. Once objects 34 are placed in the truck bed 12, the user can traverse the front shell 28 so that the front shell 28 is 90° with respect to the rear shell 30, shown in FIG. 12. The left and right side panels 44, 46 can be rotated outward as shown in FIG. 13. Moreover, left and right elongating panels 56, 58 can also be rotated to close the gap 60 between the left and right side panels 44, 46 and the left and right side walls 36, 38 of the truck bed 12. Once the latches 60, 62 are secured to the receivers, objects 34 placed on the truck bed cannot slip out of the truck bed 12 due to the front shell 28, left and right side panels 44, 46 and the left and right elongating panels 56, 58.

The front and rear shells 20, 30, left and right side panels 44, 46 and the left and right elongating panels 56, 58 may be fabricated from a variety of materials including but not limited to carbon fiber, steel, fiberglass, plastic, aluminum, and other materials known in the art or developed in the future.

The tailgate 10 described herein has been describe as a replacement to a factory tailgate. However, it is also contemplated that the tailgate may be offered as original equipment from the factory or manufacturer.

Figure 15:
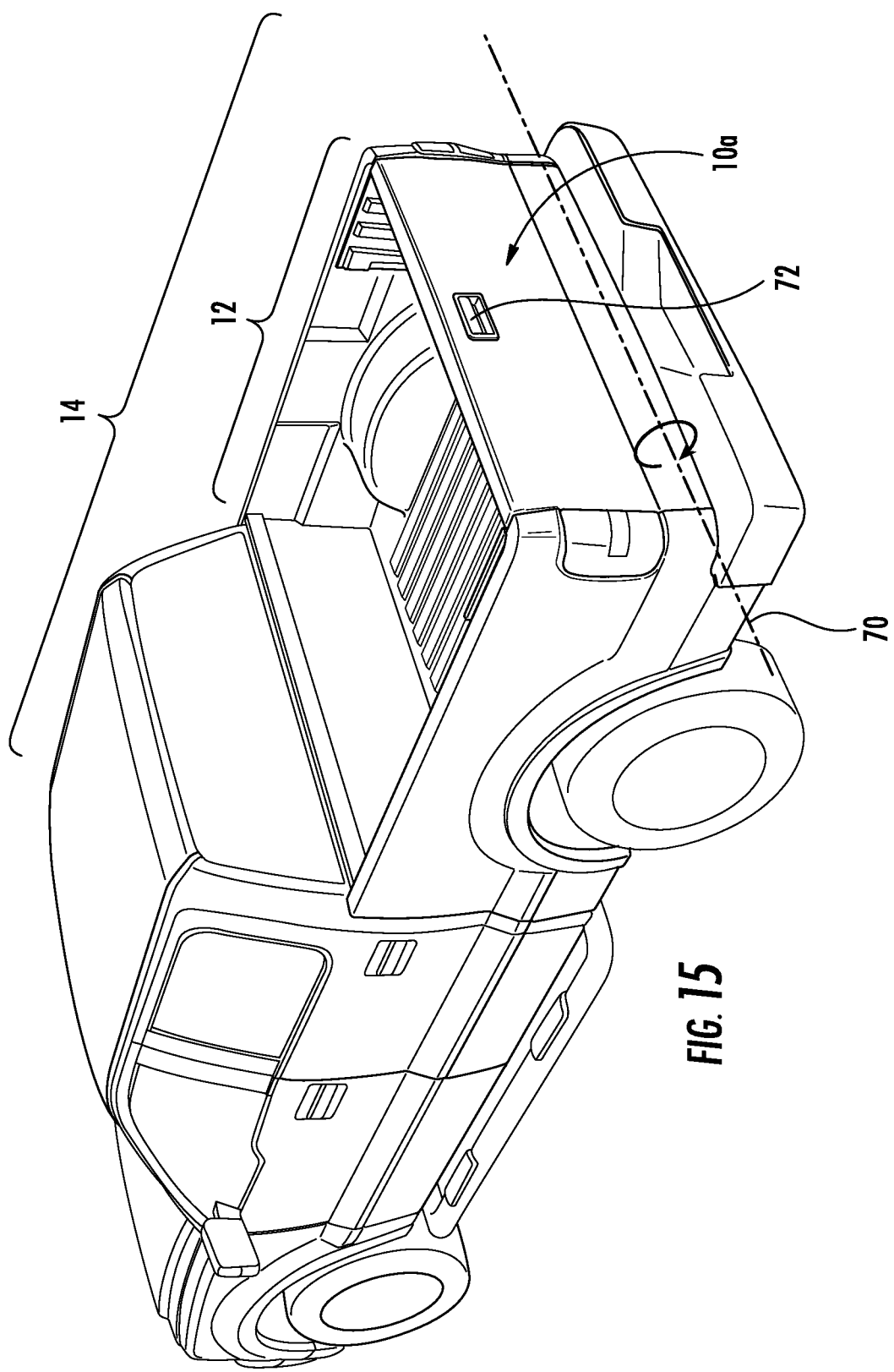
FIG. 15 illustrates another embodiment of the pick up truck bed elongator.
Figure 16:
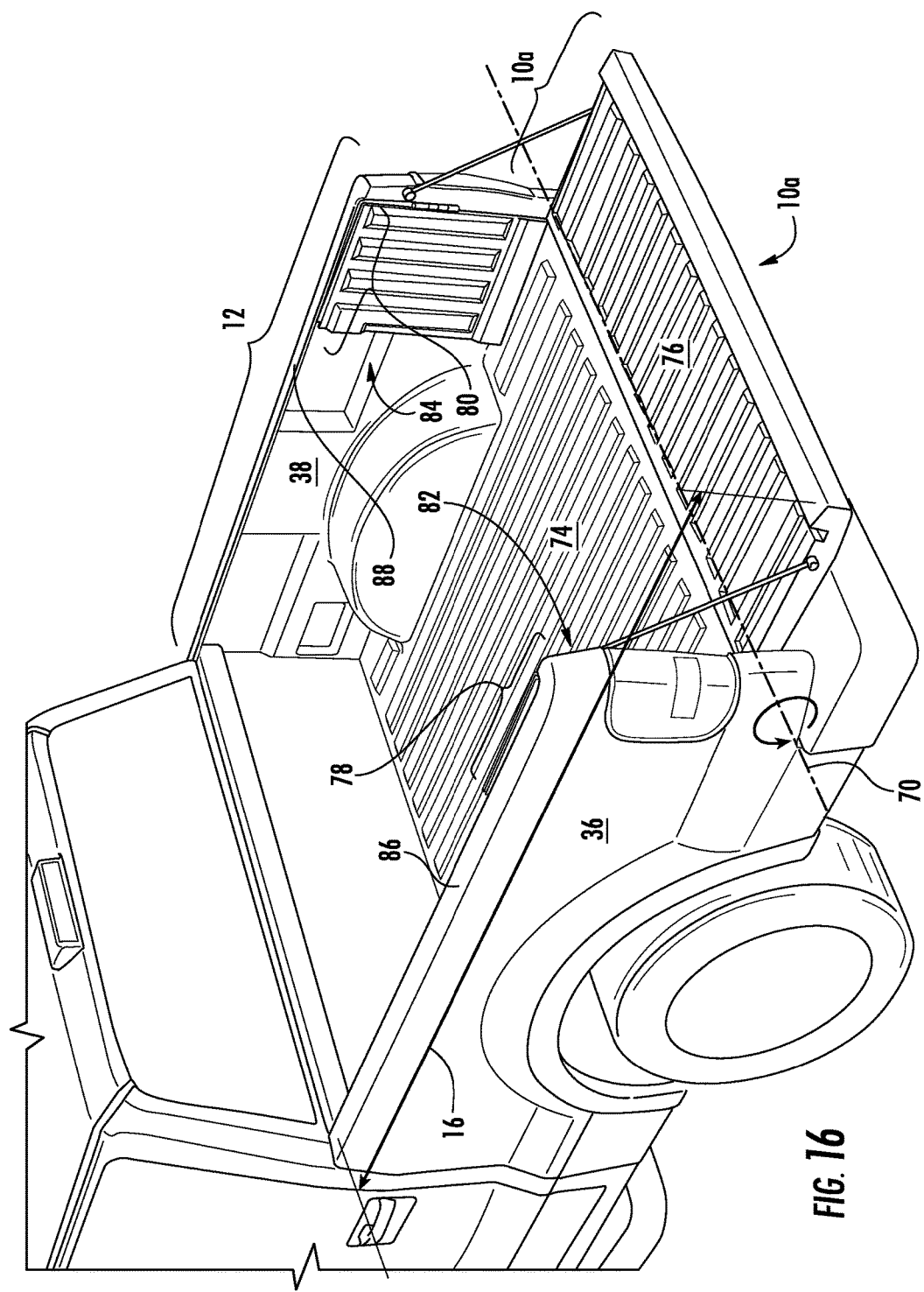
FIG. 16 illustrates the elongator of FIG. 15 with a tailgate in an opened position.
Figure 17:
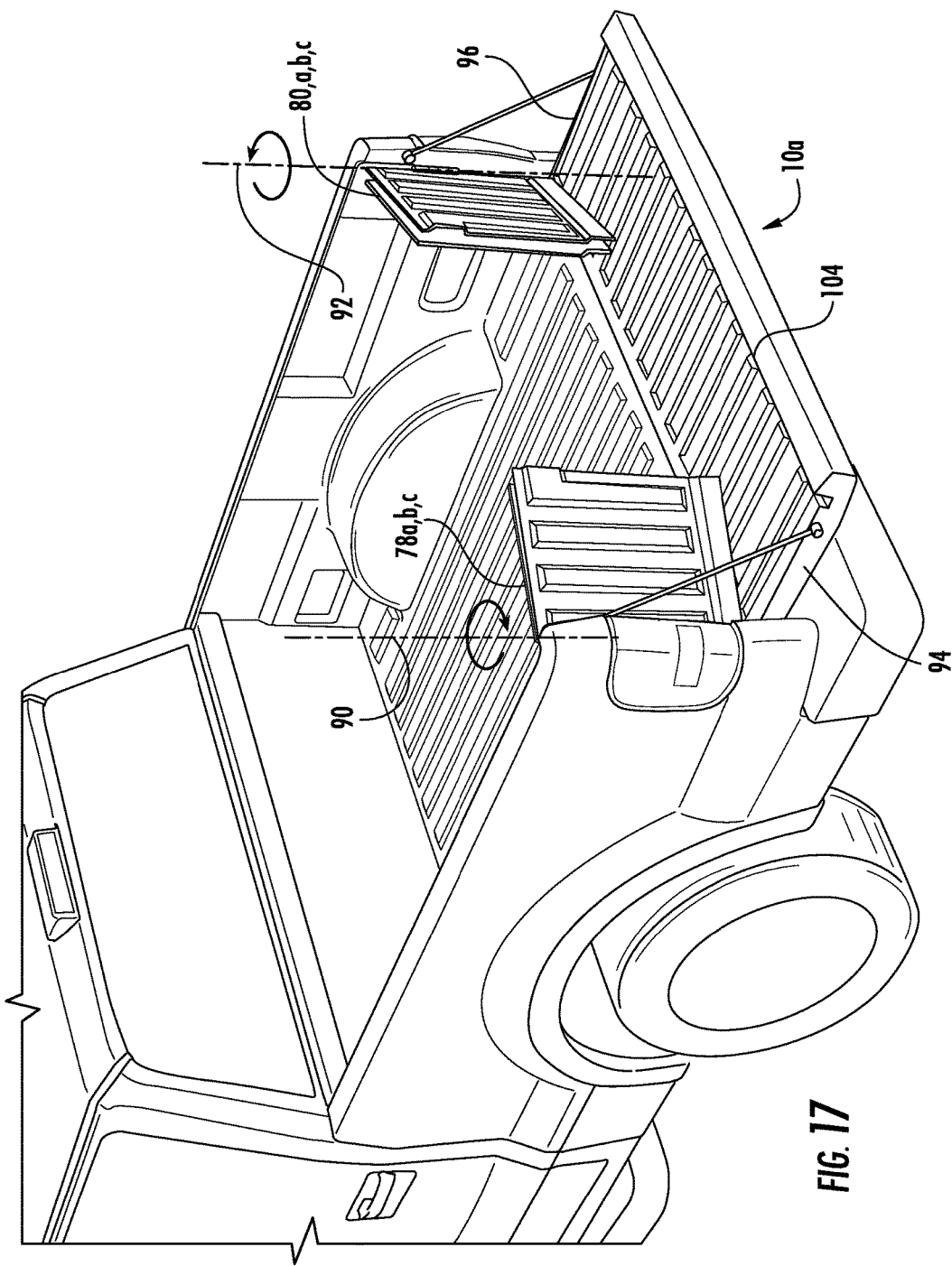

Referring now to FIGS. 15-20, a second embodiment of the apparatus and device for extending the factory length 16 (see FIG. 16) of the truck bed 12 of the truck 14 is shown. In particular, the replacement tailgate 10a may be attached to the truck bed 12 by attaching the tailgate 10a to the standard attachment mechanisms provided in the truck 14. By way of example and not limitation, the tailgate 10a may be pivotally attached to a rear portion of the truck bed 12. The tailgate 10a may pivot about pivot axis 70. Preferably, the pivot motion of the tailgate 10a may be limited to 90° as shown in FIGS. 15 and 16. The tailgate 10a when in the vertical orientation may be in the locked position and unlocked only when the user grips the handle 72 and releases the latching mechanism between the tailgate 10a and the factory latching mechanisms in the side walls of the truck bed 12 of the truck 14. When the tailgate 10a is pivoted downward as shown in FIG. 16, the tailgate 10a and more particularly an upper surface 76 of the tailgate 10a may be coplanar with an upper surface 74 of the truck bed 12 so that the tailgate 10a now extends the length 16 of the truck bed 12 plus the tailgate 10a. Objects 34 placed within the truck bed 12 may be retained therein with a plurality of driver-side vertical panels 78 and passenger-side vertical panels 80 which are stacked, folded, and stored into cavities 82, 84 formed by the side walls 36, 38 and the top ledge 86, 88 of the left and right side walls 36, 38. It is also contemplated that the plurality of driver-side vertical panels 78 and passenger-side vertical panels 80 may be stacked, folded and stored adjacent to but not within a cavity of the sidewalls 36, 38.

The passenger-side vertical panels 80a-c and the driver-side vertical panels 78a-c may be pivoted out as shown in FIGS. 17-20. In particular, panels 78a, 80a may pivot around 90° about vertical pivot axes 90, 92. The vertical panels 78a, 80a may extend out until the vertical panels 78a, 80a are parallel to left and right side edges 94, 96 of the tailgate 10a, shown in FIG. 18. The vertical panels 78a, 80a may be secured in this position by means known in the art or developed in the future. By way of example and not limitation, the vertical panels 78a, 80a may have detents or other latching mechanisms that may be used to attach the vertical panels 78a, 80a to the tailgate 10a.

Figure 20:
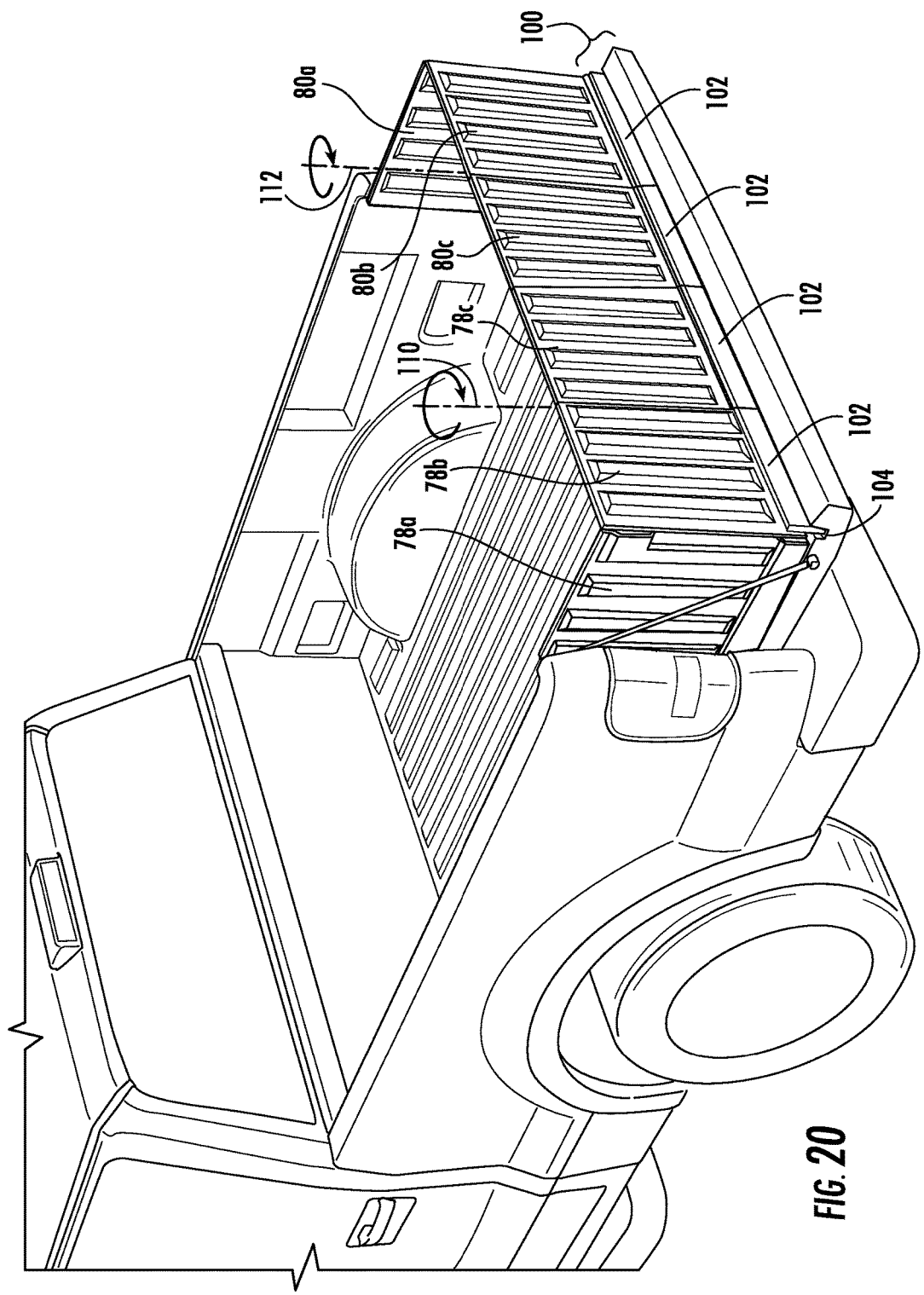
FIG. 20 illustrates the elongator of FIG. 15 with the first through third vertical panels traversed to the expanded position.

The panels 78b, 80b may be pivoted until the panels 78b, 80b are generally parallel with the back edge 98 of the tailgate 10a. The panels 78b and 80b may be pivoted about vertical pivot axes 104, 106. Likewise, the vertical panels 78c, 80c may be pivoted to close the opening 108 as shown in FIG. 20. The vertical panels 78c, a-c may be pivoted about vertical pivot axes 110, 112. The bottom edge portions 100 of the panels 78b, c and 80b, c may have a rubberized weather stripping 102. The weather stripping 102 may be received into a groove 104 formed in the upper surface 76 of the tailgate 10a. The panels 78b, c and panels 80b, c may be held in position by way of latching mechanisms known in the art or developed in the future. By way of example and not limitation, these latching mechanisms include but are not limited to detents, over center latches, etc. Moreover, the disposition of the weather strip 102 of the panels 78b, c and 80b, c also help to retain the panels 78b, c, 80b, c parallel to the back edge 98 of the tailgate 10a. The two vertical panels 78c, 80c may also be latched together with the latching mechanism known in the art or developed in the future. In this manner, objects 34 placed in the truck bed may roll around in the truck bed 12 but will not roll out of the truck bed 12 because the objects 34 are blocked by the vertical panels 78a, b, c and panels 80a, b, c.

The tailgate has been described as having third vertical panels 78c and 80c in order to close the back edge of the tailgate. However, it is also contemplated that the second vertical panels 78b and 80b which are rotatably attached to the first vertical panels 78a and 80a may be sufficiently long so that distal ends of the second vertical panels 78b and 80b can be latched to each other with the latching mechanism that latches the third vertical panels 78c and 80c together, as discussed above.

Figure 18:
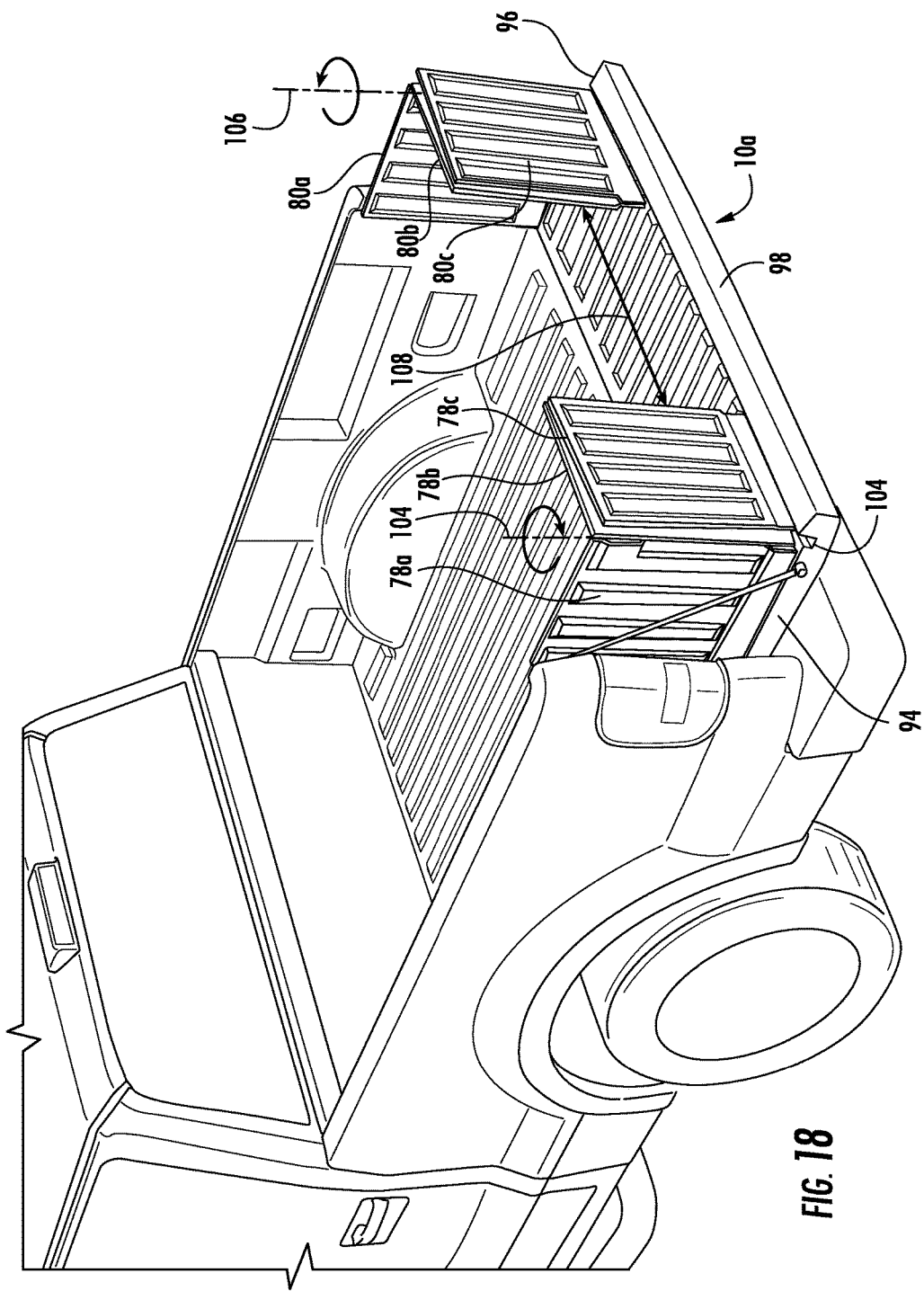
FIG. 18 illustrates the elongator of FIG. 15 with the first and second vertical panels traversed to the expanded position.
Figure 19:
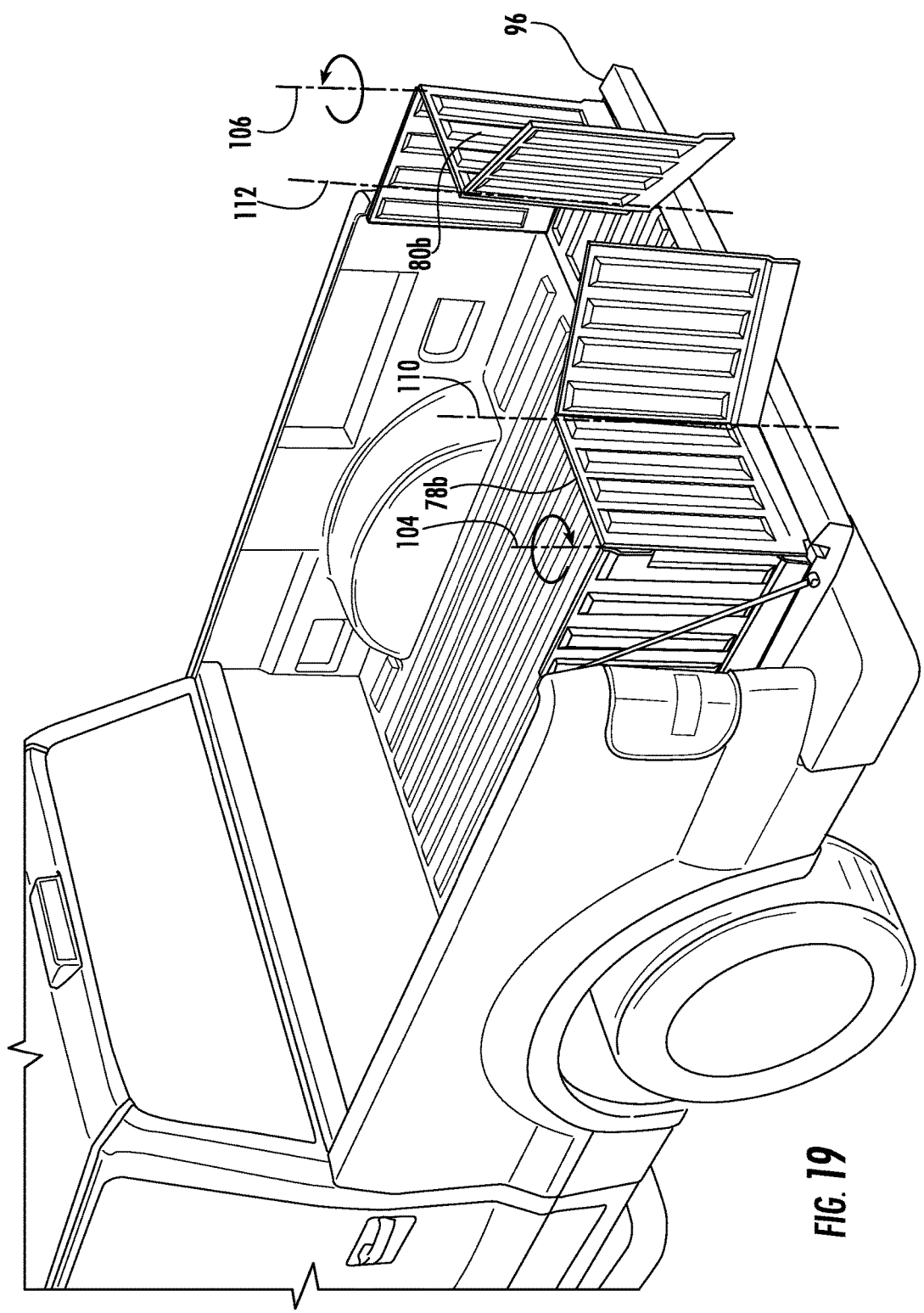
FIG. 19 illustrates the elongator of FIG. 15 with the third vertical panel being traversed to the expanded position.

In a variant of the second embodiment of the tailgate 10a, the original factory tailgate may be utilized in conjunction with the left and right vertical panels 70a, b, c and vertical panels 80a, b, c. To this end, the hinge that allows the panels 78a, 80a may be pivoted about vertical pivot axes 90, 92 may be locked to be pivoted in the deployed state as shown in FIG. 18. Likewise, the hinge that enables the panels 78b, 80b to pivot about vertical pivot axes 104, 106 may be locked in the deployed state as shown in FIG. 19. Optionally, the hinge that enables the panels 78c, 80c to pivot about vertical axes 110, 112 may be locked in the deployed state as shown in FIG. 20 or alternatively the panels 78c and 80c may freely rotate out the vertical pivot axes 110, 112 and be locked in the deployed state as shown in FIG. 20 by way of the latching mechanism that secures the panels 78c to 80c and vice versa.

In the second embodiment, the passenger-side vertical panels are made up of three panels 80a-c. The driver-side vertical panels 78 are also made up of three vertical panels 78a-c. It is also contemplated that the panel 78a and 80a which are parallel to the left and right edges 94, 96 of the tailgate 10a may be made up of one or more panels that are rotatably attached to each other. The panels 78b-c and 80b-c may also be each made up of one or more panels that are rotatably attached to each other.

The above description is given by way of example, and not limitation. Given the above disclosure, one skilled in the art could devise variations may be within the scope and spirit of the invention disclosed herein, including various ways of securing the panels to the factory receiver of the factory tailgate of the truck bed. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A tailgate extender for a bed of a truck, the tailgate extender comprising:

first and second driver-side vertical panels, the first driver side vertical panel traversably attached to a driver side sidewall of the bed of the truck, the second driver side vertical panel pivotally attached to the first driver side vertical panel wherein the first and second driver side vertical panels are stackable adjacent to each other and disposable adjacent to the driver side sidewall of the bed of the truck, the first driver side vertical panel being traversable so as to be parallel to a driver side edge of a tailgate, the second driver side vertical panel being pivotable so as to be parallel to a back edge of the tailgate;

first and second passenger-side vertical panels, the first passenger side vertical panel traversably attached to a passenger side sidewall of the bed of the truck, the second passenger side vertical panel pivotally attached to the first passenger side vertical panel, wherein the first and second passenger side vertical panels are stackable adjacent to each other and disposable adjacent to the passenger side sidewall of the bed of the truck, the first passenger side vertical panel being traversable so as to be parallel to a passenger side edge of the tailgate, the second passenger side vertical panel being pivotable so as to be parallel to the back edge of the tailgate;

the tailgate defining an upper surface with a groove for receiving the second driver side and passenger side vertical panels.

2. The tailgate extender of claim 1 wherein the tailgate is a replacement tailgage.

3. The tailgate extender of claim 1 wherein the groove is parallel with the back edge of the replacement tailgate.

4. The tailgate extender of claim 3 wherein the second driver side and passenger side vertical panels have flexible strips at a bottom end of the second driver side and passenger side vertical panels which are receivable in the groove formed in the tailgate.

5. A method of extending a truck bed of a truck, the method comprising the steps of:
   providing driver-side first, second and third vertical panels which are stacked upon each other and disposed adjacent to a driver-side sidewall of the truck bed;
   providing a passenger-side first, second and third vertical panels which are stacked upon each other and disposed adjacent to a passenger-side sidewall of the truck bed;
   pivoting a tailgate to an opened position so that an upper surface of the tailgate is generally coplanar with an upper surface of the truck bed;
   traversing the driver side first, second and third vertical panels away from the driver side sidewall so that the driver side first vertical panel is parallel with a driver side edge of the tailgate;
   traversing the passenger side first, second and third vertical panels away from the passenger side cavity so that the passenger side first vertical panel is parallel a passenger side edge of the tailgate;
   pivoting the driver side and passenger side second vertical panels away from the driver side and passenger side first vertical panels so that the second vertical panels are parallel to a back edge of the tailgate;
   pivoting the driver side third vertical panel away from the driver side first vertical panel so that the driver side third vertical panel is parallel to the back edge of the tailgate;
   pivoting the passenger side third vertical panel away from the passenger side first vertical panel so that the passenger side third vertical panel is parallel to the back end of the tailgate.

6. The method of claim 5 wherein the steps of traversing the driver and passenger side first vertical panels includes pivoting the driver side and passenger side first vertical panels.

7. The method of claim 5 wherein the step of pivoting the driver side and passenger side second vertical panels away from the driver side and passenger side first vertical panels includes the step of:
   disposing weather stripping attached to bottom portions of the driver side and passenger side second vertical panels in a groove formed in the upper surface of the tailgate.

8. A tailgate extender for a bed of a truck, the tailgate extender comprising:
first and second driver-side vertical panels, the first driver side vertical panel traversably attached to a driver side sidewall of the bed of the truck, the second driver side vertical panel pivotally attached to the first driver side vertical panel wherein the first and second driver side vertical panels are stackable adjacent to each other and disposable adjacent to the driver side sidewall of the bed of the truck, the first driver side vertical panel being traversable so as to be parallel to a driver side edge of a tailgate, the second driver side vertical panel being pivotable so as to be parallel to a back edge of the tailgate;
first and second passenger-side vertical panels, the first passenger side vertical panel traversably attached to a passenger side sidewall of the bed of the truck, the second passenger side vertical panel pivotally attached to the first passenger side vertical panel, wherein the first and second passenger side vertical panels are stackable adjacent to each other and disposable adjacent to the passenger side sidewall of the bed of the truck, the first passenger side vertical panel being traversable so as to be parallel to a passenger side edge of the tailgate, the second passenger side vertical panel being pivotable so as to be parallel to the back edge of the tailgate;
a third driver side vertical panel pivotally attached to the second driver-side vertical panel and a third passenger-side vertical panel pivotally attached to the second passenger-side vertical panel.

9. The tailgate extender of claim 1 wherein the first and second driver-side vertical panels are stackable adjacent to each other and disposable adjacent to an inner side of the driver-side sidewall of the bed of the truck, and the first and second passenger-side vertical panels are stackable adjacent to each other and disposable adjacent to an inner side of the passenger-side sidewall of the bed of the truck.

10. The tailgate extender of claim 1 wherein the first driver side vertical panel is pivotally attached to the driver side sidewall of the bed of the truck and the first driver side vertical panel is pivotable so as to be parallel to the driver side edge of a tailgate, and the first passenger side vertical panel is pivotally attached to the passenger side sidewall of the bed of the truck and the first passenger side vertical panel is pivotable so as to be parallel to the passenger side edge of the tailgate.

* * * * *